United States Patent [19]

Minami

[11] 4,441,652

[45] Apr. 10, 1984

[54] EXCHANGEABLE UNIT STEAM TRAP

[75] Inventor: Masahumi Minami, Sakai, Japan

[73] Assignee: Miyawaki Steam Trap Mfg. Co., Ltd., Osaka, Japan

[21] Appl. No.: 346,326

[22] Filed: Feb. 5, 1982

[51] Int. Cl.³ ............................................. G05D 23/12
[52] U.S. Cl. ...................................... 236/56; 236/100; 251/367
[58] Field of Search ...................... 236/56, 100, 93 A; 251/367; 285/396; 403/349

[56] References Cited

U.S. PATENT DOCUMENTS

| 7,318 | 4/1850 | Brown | 285/396 |
|---|---|---|---|
| 2,084,470 | 6/1937 | Wells | 236/56 |
| 2,396,138 | 3/1946 | Vernet | 236/93 A X |
| 2,444,758 | 7/1948 | Stillbach | 403/349 X |
| 3,403,853 | 10/1968 | Monroe, Jr. | 236/56 |
| 4,016,901 | 4/1977 | Kenny | 236/56 X |
| 4,176,815 | 12/1979 | Davidson et al. | 403/349 X |
| 4,288,032 | 9/1981 | Hetz | 236/56 |
| 4,305,180 | 12/1981 | Schwartz | 285/396 X |

FOREIGN PATENT DOCUMENTS 473063 10/1937 United Kingdom ................. 236/56

Primary Examiner—William E. Tapolcai
Attorney, Agent, or Firm—Sughrue, Mion, Zinn, Macpeak and Seas

[57] ABSTRACT

A steam trap includes a casing having an inlet and an outlet, a cover secured to the casing to enclose a condensate reservoir in the casing and a trap unit having a valve closing and opening by thermal expansion and contraction of a thermoelement such as thermowax in response to temperature in the reservoir and a counter spring whose spring force acts against the thermal expansion of the thermoelement. The disclosed steam trap comprises connection means for connecting the cover and the trap unit only by relative movement therebetween and a support spring arranged between the cover and the thermoelement. The steam trap is therefore, conveniently adaptable to change in used conditions by suitable selection of trap units having various temperature characteristics previously prepared and is capable of effectively replacing its trap unit with a new one for repairing.

3 Claims, 4 Drawing Figures

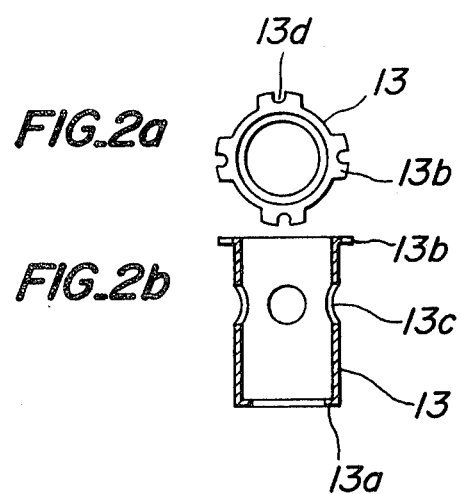
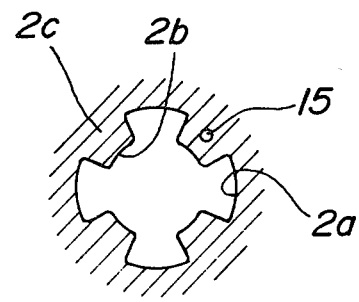

EXCHANGEABLE UNIT STEAM TRAP

BACKGROUND OF THE INVENTION

1. Field of the Invention

This invention relates to an exchangeable unit steam trap, and more particularly to a steam trap capable of easily exchanging its trap unit according to used conditions, for example, set drain temperatures or easily replacing its trap unit with a new one for repairing.

2. Description of the Prior Art

Various kinds of steam traps have been used. For example, there has been proposed a steam trap using a wax mixed with metal powder whose thermal expansion causes a valve in the trap to open and thermal contraction due to relatively low temperature drain water opens the valve. In general, with such a steam trap, a temperature at which condensate or condensed water is exhausted is determined by a performance of a thermoelement for example thermowax assembly incorporated in a trap unit of the steam trap. This hitherto used steam trap is, however, complicated in construction which could not rapidly adapt itself to variations in used condition and is difficult to replace its trap unit with a new one for repairing.

There has been also proposed a steam trap whose draining temperature is adjustable by rotating an adjusting screw by means of a screw driver after a removal of a cap of the steam trap. With this steam trap, however, the adjustment of the draining temperature requires great skill and is difficult to replace its trap unit for repairing.

SUMMARY OF THE INVENTION

It is a principal object of the invention to provide an improved steam trap capable of easily exchanging its trap unit.

It is a further object of the invention to provide an exchangeable unit steam trap which is able to adapt itself to applications different in draining temperature by suitable selection of trap units having various temperature characteristics previously prepared with a trap casing and a cover as common parts, whereby the steam trap is conveniently adaptable to change in used conditions and capable of effectively replacing its trap unit with a new one for repairing.

In order that the invention may be more clearly understood, preferred embodiments will be described, by way of example, with reference to the accompanying drawings.

BRIEF DESCRIPTION OF THE DRAWINGS

FIG. 2a is a plan view of a sleeve used in the steam trap shown in FIG. 1;

FIG. 2b is a longitudinal sectional view of the sleeve shown in FIG. 2a; and

FIG. 3 is a sectional view of a principal part of a cover used in the steam trap shown in FIG. 1.

DETAILED DESCRIPTION OF THE PREFERRED EMBODIMENT

Figure 1:
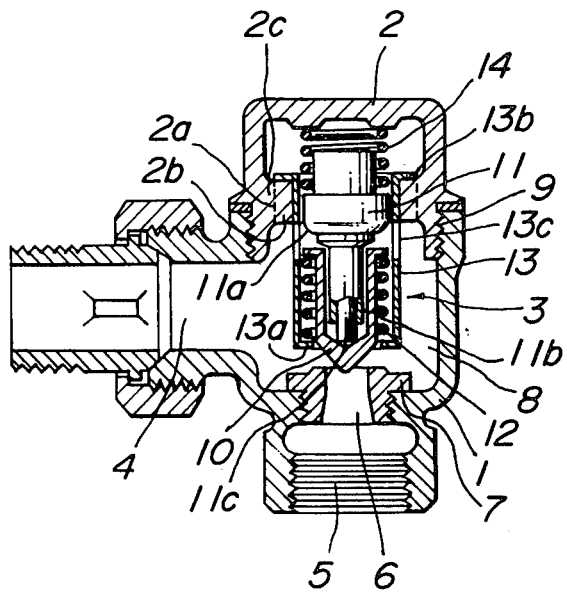
FIG. 1 is a sectional view of a steam trap of a preferred embodiment of the invention.

FIG. 1 illustrates a steam trap of a preferred embodiment of the invention, which comprises a casing 1, a cover 2 and a trap unit 3. The casing 1 includes an inlet 4 and an outlet 5 for condensate or condensed water and a valve opening 6 directing in this case to the outlet 5, at which valve opening a valve seat 7 is provided as usual to form a condensate reservoir 8 in the casing 1.

The cover 2 is secured to the casing 1 by directly screwing the former into the latter as shown at 9 in FIG. 1 or by means of bolts and nuts and a suitable flange provided on the casing (not shown) to enclose and separate the condensate reservoir 8 from the outside.

The trap unit 3 comprises in a sleeve 13 a valve 10 adapted to be seated on the valve seat 7 to close the valve opening 6, a thermoelement 11 consisting of for example a thermowax assembly which urges the valve 10 into contact with the valve seat 7 when the temperature in the condensate reservoir 8 rises, and a counter spring 12 whose spring force opposes the thrust of the thermoelement caused by its thermal sensibility. The sleeve 13 is formed at its lower end with an inward flange 13a supporting one end of the counter spring 12, at the other end with a plurality of outward lugs 13b formed by partially bending the edge of the sleeve 13 as shown in FIGS. 2a and 2b, and at midway with through-apertures 13c opening toward the side of the thermoelement 11. The thermoelement is preferably the thermowax assembly above mentioned comprising so-called thermowax consisting of wax, preferably a composition having a great difference between coefficients of thermal expansion in its solid and liquid states and metal powder mixed with the wax for the purpose of increasing the thermal sensibility of the wax. A stem 11c is adpted to slide in a reduced diameter portion 11b of a flanged cylindrical housing 11a as shown by an action of the expansion of the wax to transmit the thrust derived from the thermal sensibility of the wax to the valve 10. The flanged cylindrical housing 11a accommodates therein the thermowax and the stem 11c to form the thermowax assembly.

As shown in FIG. 3, in this embodiment the cover 2 is formed with an inward flange 2c having alternate ridges 2b and slots 2a which permit the outward lugs 13b to pass therethrough. With this arrangement, the trap unit 3 is anchored in its normal position as shown in FIG. 1 on the inward flange 2c of the cover 2 in a bayonet connection. A support spring 14 is arranged between an inner surface of the cover and the flange of the cylindrical housing 11a of the thermoelement 11.

The support spring 14 not only serves to provide a reaction force required to depress the valve 10 toward the valve seat 7 against the spring force of the counter spring 12 acting on the valve 10 when the thrust of the thermoelement 11 caused by its thermal sensibility is transmitted through the stem 11c to the valve 10 but it also takes up an extraexpansion of the thermoelement due to an extraordinary temperature rise in the condensate reservoir 8 when closing the valve.

With this arrangement as above described, the condensate enters the condensate reservoir 8 through the inlet 4 and is exhausted at relatively low temperature through the valve opening 6 and the outlet 5 and in response to such a water flowing the succeeding condensate sequentially enter the reservoir through the inlet 4. As the temperature of the succeeding condensate rises, the temperature of the thermoelement 11 rises to cause its expansion force which depresses the valve 10 through the stem 11c against the counter spring 12, thereby maintaining the valve 10 in a balanced position. In the balanced position of the valve 10, the condensate at a constant temperature is continuously exhausted so long as the condensate temperature is unchanged. If the temperature of the condensate to be exhausted further rises, the valve becomes in contact with the valve seat to close the valve opening 6. In this case, the maximum compression force of the counter spring 12 at the closed position of the valve 10 is set equivalent to or higher than the valve closing force determined by the pressure in the condensate reservoir 8 acting upon the effective pressure receiving area of the valve opening, so that as soon as the condensate temperature in the reservoir 8 becomes lower than the set exhaust water temperature, the counter spring 12 raises the valve 10 into an open position where the force of the counter spring 12 again balances with the thermosensitive thrust of the thermoelement acting upon the valve 10, thereby continuing exhausting the condensate at a temperature lower than the set exhaust water temperature.

In the above operation, the trap unit 3 is held in its anchored position with the outward lugs 13b of the sleeve 13 and the inward flange 2c of the cover 2 by a frictional force caused by the depressing force of the support spring 14. There is however a risk of the trap unit 3 being subjected to a rotating force due to a violent flow of the condensate in the reservoir 8 or other reasons to be rotated into a position where the outward lugs 13b of the sleeve 13 are aligned with the slots 2a of the inward flange 2c. In order to prevent the sleeve 13 from being rotated, an anchoring pin 15 such as a knock pin, spring pin or cotter pin is preferably planted in one of the ridges 2b of the inward flange 2c so as to be fitted in one of notches 13d formed in the outward lugs 13b.

In an installation of the steam trap constructed as above described, a suitable trap unit is selected from trap units previously prepared having various temperature characteristics, respectively, and is combined with a cover 2 by the bayonet connection and thereafter the cover 2 with the trap unit 3 is threadedly engage with a casing 1, thereby enabling a draining water temperature of the steam trap to adapt to its application simply, easily and reliably. In order to exchange the trap unit with a new one for a modification of the using conditions or a failure, moreover, all that is required of an operator is to effect the above assembling after removal of the cover 2 from the casing 1.

The steam trap including the trap unit incorporating therein the thermoelement according to the invention is therefore able to exchange or replace the trap unit simply and easily depending upon temperature conditions determined by relevant thermoelements. The casing and cover of the steam trap can be commonly used for various temperature characteristics, thereby simply adapting the steam trap to modification of used conditions and easily repairing its failure.

It is further understood by those skilled in the art that the foregoing description is that of preferred embodiments of the disclosed steam trap and that various changes and modifications may be made in the invention without departing from the spirit and scope thereof.

What is claimed is:

1. An exchangeable unit steam trap comprising; a casing having an inlet, an outlet and a valve opening communicating with said outlet for condensate, a cover detachably secured to said casing to enclose a condensate reservoir in the casing, and a trap unit having a sleeve enclosing therein a valve closing and opening the valve opening in response to temperature in said reservoir, a thermowax element generating a thrust acting upon said valve in response to said temperature and a counter spring whose spring force acts against said thrust of said thermowax element, said sleeve formed at its lower end with an inward flange supporting a lower end of said counter spring whose upper end supporting said valve and, said sleeve is formed at its upper end with a plurality of outward lugs each being formed with a notch, and said cover is formed with an inward flange having alternate ridges and slots which permit said outward lugs to pass therethrough and includes at least one anchoring pin planted in said ridge for engaging said notch of said sleeve to prevent the sleeve from being rotated about its axis when the trap unit is in position, a bayonet connection enabling said cover and said trap unit to be connected only by relative movement therebetween, said bayonet connection comprises lugs formed in said sleeve of the trap unit and slots formed in said cover permitting said lugs to pass therethrough, so that the trap unit is partially inserted in the cover with said lugs passing through said slots of the cover and then is slightly rotated about its axis to connect the trap unit to the cover, and, a support spring arranged between said cover and said thermowax element.

2. An exchangeable unit steam trap as set forth in claim 1, wherein at least one anchoring pin is planted in the proximity of said slots of the cover and at least one notch is formed in the lugs such that said anchoring pin is fitted in said notch to prevent the sleeve from being rotated about its axis when the trap unit is in position.

3. An exchangeable unit steam trap as set forth in claim 1, wherein said trap unit is replaceable with others having various thermal characteristics required for the steam trap.

* * * * *